ated Jan. 25, 1916.
UNITED STATES PATENT OFFICE.

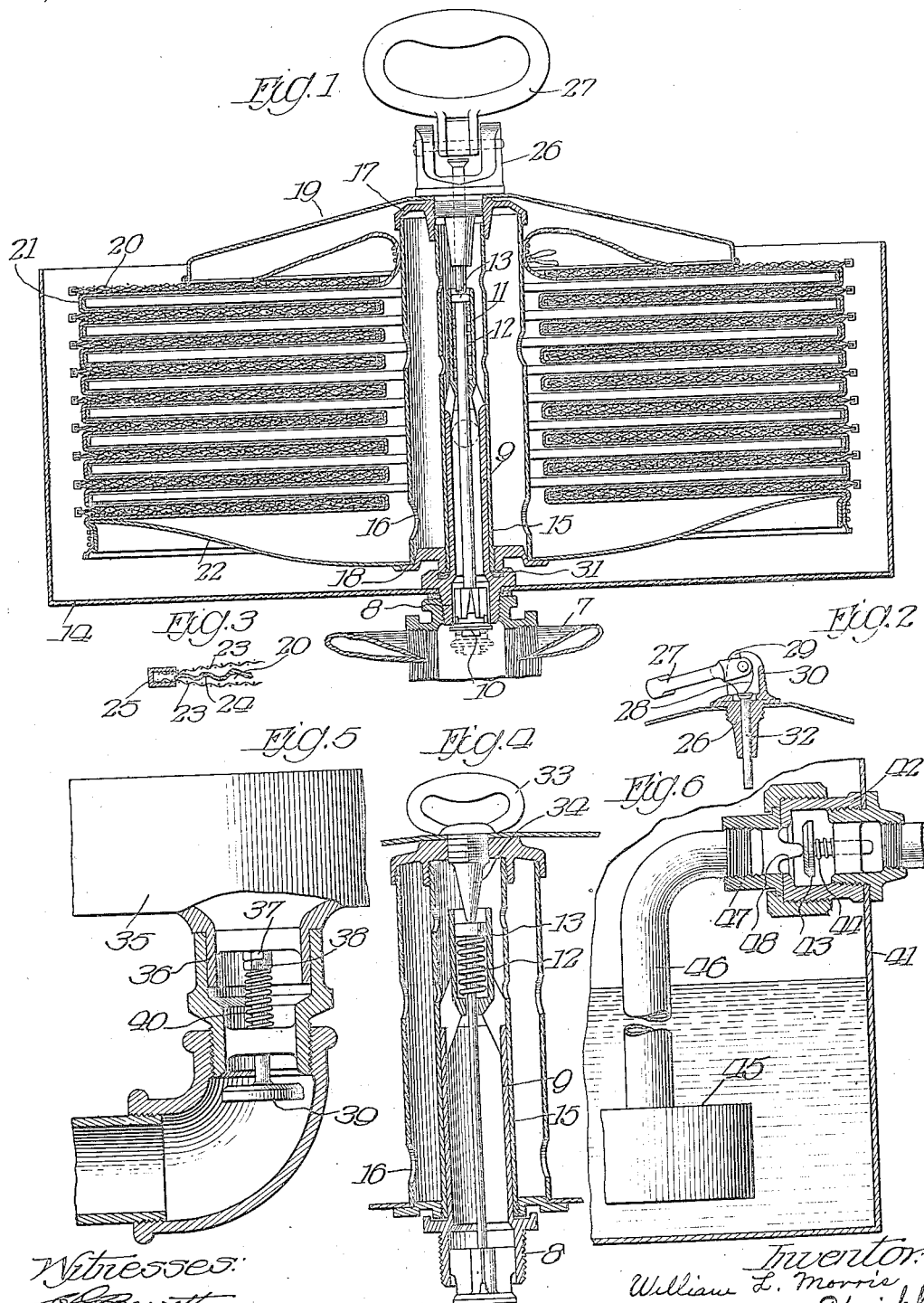

WILLIAM L. MORRIS, OF FORT WAYNE, INDIANA.

FILTER-VALVE.

1,169,418.	Specification of Letters Patent.	Patented Jan. 25, 1916.

Application filed July 18, 1914. Serial No. 851,680.

*To all whom it may concern:*

Be it known that I, WILLIAM L. MORRIS, a citizen of the United States, residing at Fort Wayne, in the county of Allen and State of Indiana, have invented certain new and useful Improvements in Filter-Valves, of which the following is a specification.

This invention relates to a combined valve and filter, and the principal object of the invention is to provide a valve which may be opened or closed at will when the filter is in position, with the added provision that the valve will be automatically closed at any time that the filter is removed.

For the attainment of these ends and the accomplishment of other new and useful improvements as will appear, the invention consists in the features of novelty in the construction, combination and arrangement of the several parts generally shown in the accompanying drawings and described in the specification, but more particularly pointed out in the appended claims.

In the drawings: Figure 1 is a view mostly in section of a combined filter and valve constructed in accordance with the principles of this invention; Fig. 2 is a view with the handle or hand-lever in operating position; Fig. 3 is a detail view of one of the separating disks; Fig. 4 shows a modified form of valve operating member, and Figs. 5 and 6 are other modified forms.

To a fluid conductor or container, designated generally by the reference numeral 7, a valve casing 8 is connected which may be formed with an extension 9 and in which is movable a valve 10. The valve is provided with a spring 11 which tends to hold it normally with the valve in contact with its seat or in closed position. In the form shown by Fig. 1 the extension 9 carries a casing 12 in which a headed extension 13 of the valve stem is movable and with the spring 11 bearing against the head in the inner end of the casing tending to hold the valve in its seat. Supported by the valve is a casing 14 and disposed within the casing is a removable filter or other suitable receptacle having a perforated inner shell 15 fitting the extension 9 closely and a perforated outer shell 16 with top and bottom pieces 17 and 18 to hold the perforated shells in proper spaced relation. Supported by the perforated casings is a filtering sleeve 19 gathered and distended at intervals by means of spacing disks 20 and spring rings 21. The ends of the filtering sleeve 19 are fastened by fluid-tight joints one to the outer sleeve 16 and the other to a flanged extension 22 extending from the sleeve 16. Each spacing disk 20 preferably comprises reticulated outer layers 23 spaced apart by a corrugated disk 24 with binding strips 25 at the inner and outer edges to hold the different layers of the disks together. Threaded in the top member 17 is a bearing member 26 in which is pivoted a handle 27 with a cam surface 28 and a stop surface 29. The bearing 26 is formed with an upward projection 30 to engage the stop surface 29 so that when the handle 27 is rotated from the position shown in Fig. 2 to an upright position as shown in Fig. 1 the stop surface 29 will engage the projection 30 and the entire filter may be removed from the extension 9 of the valve because of the fact that the inner sleeve 15 slips over the extension 9 and makes a fluid-tight joint therewith. A packing 31 may be inserted between the filter and the valve casing 8 to assist in making the joint fluid-tight, if desired. The cam surface 28 of the handle 27 engages a push rod 32 which is movable through the bearing 26, the lower end engaging the head of the valve stem 13. The handle 27 and the cam surface thereby constitutes a hand-lever for moving the push rod 32 and for opening or closing the valve 10 at will, when the filter is in position thereon. If the filter is removed from its position in contact with the valve at any time, it is obvious that the valve spring 11 will operate automatically to close the valve and thus prevent the passage of fluid through the valve.

It is obvious, of course, that the filter may be any receptacle or container, but there is a special combination of the valve with the filter element for the reason that it is particularly desirable to provide means for automatically closing the filter valve at any time that the filter itself is removed for cleaning or repair. It is immaterial in which direction the fluid passes through the filter or through the valve.

Various modifications are the result of the development of this particular type or combination of filter and valve; in Fig. 4 is shown a handle 33 with an integral extension 34 which engages the headed end 13 of a valve stem similar to that shown by Fig. 1. When the filter element is in position the valve is opened, as shown in Fig. 4, and when the filter is removed by means of the handle 33 the valve is automatically closed by its spring.

In Fig. 5 the receptacle 35 is provided with an extension 36 which carries an adjustable nut 37 to engage an adjustable nut 38 on the valve stem of a valve 39 acted upon by a spring 40. Also in Fig. 6 a conductor or container 41 corresponding to the fluid container 7 in Fig. 1 is provided with a valve casing 42 in which a valve 43 acted upon by a spring 44 is movable. A receptacle 45 is connected by means of a tube 46 with a fitting 47 at its end which carries a projection 48 adapted to contact with the valve 43 and to open it against the pressure of the spring 44 when the fitting 47 is secured to the valve casing 42.

All of these forms are within the spirit and scope of the present invention and comprise means for insuring that the valve which controls the passage of fluid will be closed when the filter or fluid receptacle is removed. In addition, the form shown by Fig. 1 provides means for opening and closing the valve at will when the filter or receptacle is in position on the valve.

What I claim is:

1. The combination with the fluid container and a valve therefor, of a receptacle removably supported by the container communicating therewith through the valve and having a movable handle to control the valve which insures that the valve is closed before the article can be removed from communication with the container by means of a handle.

2. The combination with a fluid container and a valve therefor, of a receptacle removably supported by the container communicating therewith through the valve, and having a pivoted handle rotatable to engage and open the valve when the receptacle is supported by the container and operative to close the valve before the receptacle can be removed by the said handle from the container.

3. The combination with a fluid container and a spring-pressed valve therefor, of a receptacle having a slip-joint connection with the container and communicating therewith through the valve, and a rotatable handle on the receptacle adapted to engage and open the valve when the receptacle is supported by the container and operative to allow the valve to close by the rotation of the handle in lifting the receptacle from the slip connection.

4. The combination with a fluid container, of a valve therefor having a protruding stem, a receptacle to receive fluid from the container through the valve, and a pivoted handle by means of which the receptacle is moved without rotation to and from its connection with the container and adapted to be rotated on its pivot to engage the said stem and open the valve by rotation about its pivot only when the receptacle is supported by the container.

5. The combination with a fluid container, of a tubular member projecting therefrom having an inwardly disposed valve seat, a spring-pressed valve having an outwardly projecting stem and adapted to coöperate with said seat, a fluid receptacle having a portion adapted to make a slip-joint with the said tubular member, and a handle for the receptacle rotatably mounted and having a cam portion by means of which the valve stem is engaged to open the valve when the handle is turned in one direction, the valve being closed by its spring when the handle is rotated to a position for lifting the receptacle from the slip connection.

6. The combination with a fluid container, of a tubular member extending therefrom having a valve seat and a spring housing, a valve to coöperate with the seat having an outwardly extending stem, a spring in the said housing tending to seat the valve, a receptacle having a portion to make a slip connection with the said tubular extension, a rod carried by the receptacle adapted to engage the valve stem, a casting through which the rod extends having a stop at one side thereof, and a handle pivoted in the casting having a cam-shaped portion to engage the rod when the handle is turned downwardly and also having a projection to engage the said stop when the handle is turned upwardly which insures that the valve will be closed by its spring before the receptacle can be removed by means of the handle, and operating means to open the valve when the receptacle is supported by the container.

In testimony whereof I have signed my name to this specification, in the presence of two subscribing witnesses, on this 8th day of July, A. D. 1914.

WILLIAM L. MORRIS.

Witnesses:
J. R. MATLACK,
F. L. LUHLER.